Nov. 27, 1923.
A. KREBS
1,475,189
METHOD AND APPLIANCE USEFUL IN PRODUCING WELDED JOINTS
Filed June 13, 1922
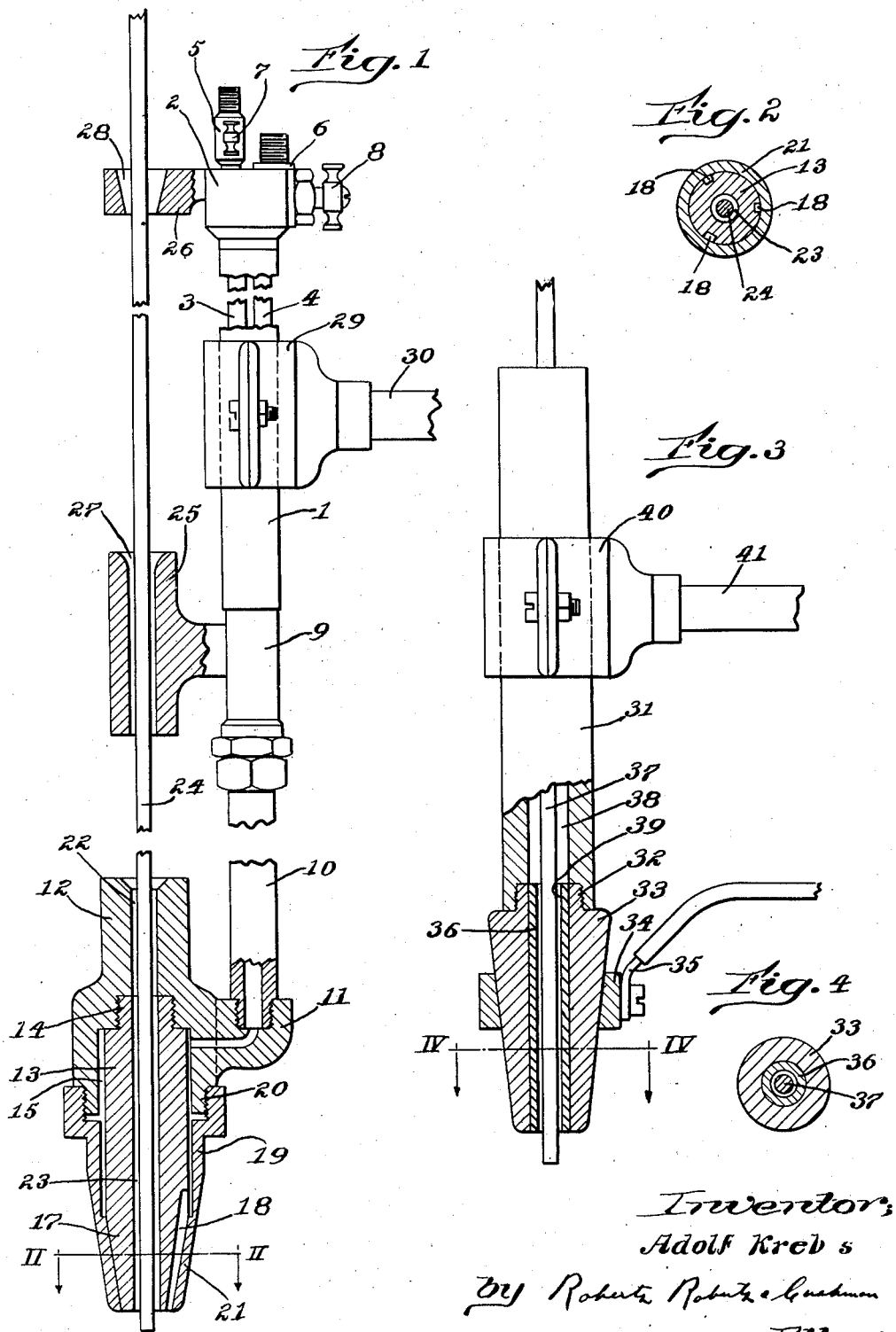

Patented Nov. 27, 1923.

1,475,189

UNITED STATES PATENT OFFICE.

ADOLF KREBS, OF JAMAICA PLAIN, MASSACHUSETTS.

METHOD AND APPLIANCE USEFUL IN PRODUCING WELDED JOINTS.

Application filed June 13, 1922. Serial No. 567,882.

*To all whom it may concern:*

Be it known that I, ADOLF KREBS, a citizen of the United States of America, and resident of Boston, Jamaica Plain, in the county of Suffolk and State of Massachusetts, have invented new and useful Improvements in Methods and Appliances Useful in Producing Welded Joints, of which the following is a specification.

This invention relates to a method of welding and to means useful in performing such method and more particularly to a method and appliance for applying welding heat locally to parts to be welded and for supplying the necessary welding material or solder for forming the seam.

In the production of an ideally perfect welded seam by the use of the oxy-acetylene blow torch or the electric arc, the existence of certain known conditions is requisite. Among these may be mentioned the heating up of the workpiece along the line of the seam to the fusion point as well as the heating of the workpiece for a certain distance upon both sides of the seam; the heating of the welding material or solder to the fusing point; and cleanliness of the workpiece and the added material at the point of union, that is to say, their freedom from oxides or other elements which by their presence might serve to prevent perfect cohesion of the molecules of the metal.

While all of these conditions are essential to the formation of an ideally perfect joint it is manifest that such conditions under ordinary circumstances do not always exist, as is evidenced by many series of tests to determine the efficiency of welded joints, among which tests may be mentioned those made by the Bureau of Standards at Washington during the year 1920. Such tests while all performed under identical conditions and by the same operator failed to produce one perfect joint. The desirability of being able to produce proper welded joints between metallic parts by the application of local heat, as for example that furnished by the oxy-acetylene or the electric arc, has long been recognized and many attempts have been made to devise apparatus capable of producing perfect welds under all ordinary conditions, but that such efforts have resulted in failure is evidenced by the results of the tests above referred to.

In order so far as possible to eliminate the uncertainty in the formation of such welded joints, it has been proposed to employ a multiple flame tip for the heating torch such as would cover not only the seam proper but would also heat the metal upon opposite sides thereof and to provide the necessary welding material by forming small flanges upon the opposite edges of the pieces to be united or by causing such edges to overlap; another method being to secure a bar or wire of welding material in the groove of the seam. In accordance with the first of these arrangements for supplying the necessary material, it is evident that the pieces to be united must be formed with a surplus flange at their abutting edges, which may add to the difficulties of construction, and the provision of which under some circumstances might not be feasible. When the other arrangements referred to are employed it is evident that the seam is protected, either by the overlapping edges of the pieces to be united, or by the welding material itself so that the heat from the torch flame or other implement may fail to extend downwardly into the seam to a sufficient distance to secure proper union of the parts, the weld being only formed at the surface, and while apparently sound, being in fact extremely unreliable. Moreover, by reason of the extremely high heat employed in such local heating there is a strong tendency to oxidize the metal, as well as to occlude oxygen or other gas within the molten metal, such occluded gas frequently being retained when the metal is cooled and tending to weaken the joint by preventing the homogeneous union of the parts at the joint as above referred to. While some attempts have been made to overcome this undesirable action by the use of fluxes, little better results have been attained thereby as there is no certainty that the slag formed by the flux will be eliminated from the joint, its inclusion in the joint weakening the latter to the same extent as oxides or occluded gas do. For an ideally perfect joint, the torch flame should play with full force upon the whole seam over that portion thereof which is being heated and at the same time should furnish all the heat necessary for the fusion of the welding material to be added, but during the welding operation that portion of the work being heated should be protected so far as possible from the action of the free oxygen of the air or other oxidizing elements while that part of the welding material which is being fused should also be protected in the same way. Some attempts have been made to protect the welding material from oxidization by covering it with a flux paste and while somewhat better results may be secured in this manner, such arrangement fails to prevent occlusion of gas in the molten metal or to protect the parts to be united from oxidation.

The object of the present invention is accordingly to provide means for applying heat locally to parts to be united in such manner as not only to heat the line of the seam, but also to heat the metal for a considerable distance upon either side thereof; to provide automatic means for presenting the welding material at the desired point and in desired amount without, however, obstructing the path of the flame in playing against the joint, although exposing the welding material to the necessary fusing heat; and also to so arrange the heating means that that part of the work being heated as well as that portion of the welding material which is being raised to the fusing temperature, are protected from the oxidizing influence of the air.

One mode of attaining the above object, when employing a blow torch as the heating element, may consist in providing the torch with a tip such that a flame of substantial cross sectional area is produced, capable of heating the joint not only along the seam proper but for a considerable distance to either side thereof, and in providing such torch with a centrally disposed bore or opening through which the bar of welding material may be fed to the joint. Preferably the bar will be fed by gravity through such opening, the weight of the bar being sufficient to cause it to descend with the desired speed for feeding the welding material to the joint. Preferably the torch flame will be of annular or ringlike form in cross section completely surrounding the centrally disposed welding bar. The end of the welding bar is thus protected against oxidizing action, while the spot at which the flame plays against the joint is likewise protected, and little, if any oxidizing action or occlusion of gas takes place at the point of fusion. At the same time the end of the welding bar which rests against the pieces be united at the seam is subjected to sufficient heat to cause its fusion, and as the torch is moved longitudinally of the seam, the weight of such bar tends to spread the fused material over the joint in such a manner as to insure a very secure union of the parts. As the metal at the point of fusion is substantially clean, that is to say, free from oxide or other non-metallic compounds and as the location of the welding bar is such that it does not interfere in any way with the play of the torch flame over the work, it is evident that substantially ideal conditions are provided for producing a perfect joint. When the electric arc is employed as the heating element instead of the blow torch, similar results may be secured by employing a cylindrical carbon as one of the electrodes and passing the welding bar through the central opening in such carbon, insulating material being interposed between the carbon and bar to prevent the current jumping across to the bar and thus failing to produce the desired arc. In such a construction the bar is also fed by gravity toward the point of fusion and is protected at such point by the arc itself which serves to exclude the external air and very efficiently prevents the oxidization of the welding bar at the fusion point.

In the accompanying drawings one form of blow torch as well as an electric welding device, are illustrated as exemplifying the various structural arrangements which may well be employed for attaining the above objects and in such drawings:—

Fig. 1 is a side elevation of a heating appliance of the blow torch type constructed in accordance with the present invention, certain parts thereof being shown in vertical section.

Fig. 2 is a horizontal cross section on the line II—II of Fig. 1;

Fig. 3 is a side elevation, partly in vertical section, of a modified form of heating appliance adapted for utilizing the electric arc as the heating means; and Fig. 4 is a transverse cross section on the line IV—IV of Fig. 3.

Referring to Figs. 1 and 2, the numeral 1 indicates a tubular handle member or support having a base 2 in which are secured the upper ends of a pair of tubes 3, 4 disposed within the hollow handle 1. The upper ends of these tubes communicate respectively with needle valve devices 5, 6 provided with handles 7, 8 by means of which the flow of gas therethrough may be regulated. The tube 3 is for the passage of combustible gas, while the tube 4 is for oxygen. These tubes communicate at their lower ends with a mixing chamber provided within the tubular member 9. Such chamber communicates, by means of a tube 10, with a hollow offset 11 projecting laterally from a sleeve-like torch head or burner 12. A burner tip 13 of tubular form has screw-threaded connection at the point 14 with the torch head 12, an annular chamber 15 being provided between such burner tip 13 and the lower portion of the torch head. The lower end of the burner tip is tapered, as indicated at 17, and such tapered portion is provided with a plurality of longitudinal grooves 18, three of such grooves being illustrated herein, disposed symmetrically as respects the axis of the tip. A nozzle tube or sleeve 19 surrounds the lower portion of the burner tip, being connected by screw threads at the point 20 with the lower end of the burner head. This sleeve is preferably of copper or some similar material capable of conducting heat rapidly, and is also tapered at its lower end as indicated at 21, to fit snugly against the tapered portion of the tip. This sleeve thus cooperates with the grooves 18 to form gas passages communicating with the annular space 15.

The torch head 12 is provided with a central bore 22 which aligns with a bore 23 of similar diameter in the tip 13, thus providing an axial opening extending entirely through the torch. This opening is preferably of a diameter substantially greater than that of the gas passages 18, and is of sufficient size to admit a bar 24 of welding material of any usual type, such for example as a steel rod. For guiding such bar in its movement into and through the opening 22, a pair of brackets 25, 26 are provided, such brackets being secured in fixed relation to the handle 1 and having openings 27, 28 which align with the opening 22.

A holder 29 may if desired be clamped to the handle 1, such holder being secured to a bar 30 constituting an element of a welding machine and by means of which the torch may be supported for movement along the line of the joint.

In operation, combustible gas and oxygen are fed through the tubes 3 and 4 respectively and after mixing in the chamber 9 pass into the annular chamber 15, from whence they emerge through a passage 18 in a plurality of jets, these jets, when ignited, forming a substantially continuous annular flame. The bar 24 of welding material is passed downwardly through the openings 22 and 23, its lower end protruding from the lower end of the tip 17 and being disposed within the annular wall of flame issuing from the burner nozzle. While the protruding portion of the bar is thus subjected to the heat of the flame and is thereby raised to the fusing point, it is at the same time protected from the influence of the outside atmosphere by the surrounding wall of flame so that the oxidizing action of the air is substantially prevented. Moreover, the hottest portion of the work to be welded is that which lies within the annular wall of flame above referred to, so that not only is the bar of welding material protected from oxidation, but the work at the welding point is similarly protected. Thus a clean joint is assured without the use of a flux, and without requiring especial care on the part of the operator.

As the welding bar is fed downwardly through the center of the flame it does not obstruct the latter, so that the full heating effect of the flame is available at the surface of the work, thus insuring a thorough fusing of the material of the workpiece at the welding point. Moreover, as the welding bar is held within the central bore in the torch, it is not necessary for the operator to manipulate such bar, which feeds automatically by gravity as its lower end is consumed. The tip of the bar is thus always positioned at the point of maximum heat independently of any care on the part of the operator, while the latter, by moving the torch slowly along the joint, is enabled automatically to feed the welding material to the seam in accordance with the heating of the latter.

Referring now to Figs. 3 and 4, a tubular handle is indicated at 31, such handle being of glass, porcelain, or any other suitable insulating material. This handle has screw-threaded connection, at the point 32, with the upper end of a cylindrical sleeve-like carbon electrode 33, which may if desired, be of somewhat tapered form and which is provided with a metallic fitting 34 to which one end of the conducting wire 35 may be secured. Within the carbon sleeve 33 an insulating sleeve 36 is arranged. This sleeve is preferably of porcelain or other similar heat-resistant material.

Through the sleeve 36 a bar of welding material 37 may be passed, such bar extending through the bore 38 in the handle 31 and through an aligned bore in the sleeve 36, the latter bore being of a diameter such as to provide an air space 39 between the sleeve 36 and the welding bar 37. A suitable holder 40 may be secured to the handle 31 from which a rod 41 extends, the latter serving to support the torch upon the carriage of an automatic welding machine, if desired.

With the arrangement last described, electric current is supplied through the conductor 35 to the carbon electrode 33, the latter being placed in contact with the work to be welded, which is connected to the other conductor of the electric circuit. Upon raising the electrode 33 slightly from the work an arc of substantially annular form is produced which rapidly heats the work to the fusing point. At the same time, the end of the welding bar 37 which protrudes from the lower end of the electrode and which rests upon the work is also heated to the fusing point while being protected by the annular flame of the arc. The operation of the device in so far as the welding action is concerned, is substantially like that previously described with respect to the device of Fig. 1.

While as herein shown certain specific arrangements of parts are described as useful for attaining the objects of the invention, it is clear that various changes and rearrangements of the parts, as well as modifications of the materials employed, may well be made without departing from the spirit of the invention.

What I claim is:

1. A heating appliance of the class described comprising a sleeve-like support having an axial passage for guiding a bar of welding material to the point of use, a nozzle tip secured to one end of said support and having a central bore aligning with said passage and being provided with a longitudinal groove in its outer surface, and a sleeve member cooperating with the groove in the nozzle tip to form a passage for combustible gaseous fluid.

2. A device of the class described comprising a support having a plurality of gas passageways communicating with a mixing chamber, a nozzle tip having an axial bore of a size to permit the passage of a welding bar therethrough, a plurality of longitudinally extending grooves in its outer surface, a sleeve surrounding said tip and cooperating with the several grooves to form passages for the combustible gaseous mixture, and means for conducting said mixture from the mixing chamber into the interior of said sleeve.

3. In a device of the character described, the combination with a torch head of a burner tip carried thereby, the head having a fuel chamber surrounding the tip and the tip having a plurality of fuel feeding grooves formed therein and a nozzle secured to the torch head, said nozzle having a chamber portion communicating with the chamber of the torch head and having tight engagement with the burner tip to form a closure for the grooves and direct the passage of the combustible mixture therethrough, said torch head and tip having a passage formed therethrough to receive the welding material.

4. In a device of the character described, the combination with a torch head of a burner tip carried thereby, the head having a fuel chamber surrounding the tip and the tip having a plurality of fuel feeding grooves formed therein and a nozzle secured to the torch head, said nozzle having a chamber portion communicating with the chamber of the torch head and having tight engagement with the burner tip to form a closure for the grooves and direct the passage of the combustible mixture therethrough, said torch head and tip having a passage formed therethrough to receive the welding material, the grooves in the nozzle tip being symmetrically disposed with respect to the welding material passage.

5. In a device of the character described, the combination with a torch head of a burner tip carried thereby, the head having a fuel chamber surrounding the tip and the tip having a plurality of fuel feeding grooves formed therein, and a nozzle secured to the torch head, said nozzle having a chamber portion communicating with the chamber of the torch head and having tight engagement with the burner tip to form a closure for the grooves and direct the passage of the combustible mixture therethrough, said torch head and tip having a passage formed therethrough to receive the welding material, the grooves of the tip being disposed to the discharge jets producing an annular wall of flame enclosing the discharge mouth of the welding material passage.

6. A device of the character described including a main supporting portion, a torch head carried thereby, and laterally offset with respect thereto, said torch head having a central welding material passage formed therethrough and extending parallel with the support and a guide member carried by the support in alinement with the passage in the torch head for guiding welding material thereinto.

7. A device of the character described including a support, a laterally offset torch head carried by the support and having a welding material guide passage formed therethrough extending parallel with the support, and a plurality of guides of progressively increasing diameters carried by the support and alined with the passage in the torch head for freely receiving and guiding the welding material thereinto.

8. In a device of the character described the combination with a torch head of a burner tip carried by the torch head having a tapering portion provided with convergently tapering grooves and intermediate groove defining walls and a sleeve carried by the head having tight engagement with the walls whereby the sleeve is centered by the walls and forms an outer closure for the grooved passages, the torch head and burner tip having a common passage formed centrally therethrough for introduction of welding material, the sleeve having converging tip engaging walls directing the flames produced by the fuel discharged from the chamber through the passages in the direction of the welding material.

Signed by me at Boston, Massachusetts, this 5th day of June, 1922.

ADOLF KREBS.